US008911056B2

(12) United States Patent
Mizutani et al.

(10) Patent No.: US 8,911,056 B2
(45) Date of Patent: Dec. 16, 2014

(54) ELECTRONIC INSTRUMENT AND MANAGEMENT METHOD

(75) Inventors: Tadahiro Mizutani, Nagano (JP);
Masaru Takahashi, Nagano (JP);
Hisashi Koike, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 279 days.

(21) Appl. No.: 13/049,276

(22) Filed: Mar. 16, 2011

(65) Prior Publication Data

US 2011/0234656 A1    Sep. 29, 2011

(30) Foreign Application Priority Data

Mar. 24, 2010 (JP) ................................ 2010-067459
Mar. 24, 2010 (JP) ................................ 2010-067461

(51) Int. Cl.
*B41J 29/393* (2006.01)
*B41J 29/38* (2006.01)
*G06Q 10/08* (2012.01)

(52) U.S. Cl.
CPC .................................. *G06Q 10/087* (2013.01)
USPC ..................................... 347/19; 347/5; 347/9

(58) Field of Classification Search
USPC .............................................. 347/19, 5–7, 9
See application file for complete search history.

(56) References Cited

U.S. PATENT DOCUMENTS

| 6,363,226 | B1 * | 3/2002 | Batori | 399/8 |
| 7,731,323 | B2 * | 6/2010 | Sugiura | 347/19 |
| 2002/0059106 | A1 * | 5/2002 | Tani | 705/26 |
| 2004/0179056 | A1 * | 9/2004 | Katayama | 347/19 |
| 2004/0183748 | A1 | 9/2004 | Silverbrook et al. | |
| 2005/0152544 | A1 | 7/2005 | Kizawa | |
| 2006/0268028 | A1 * | 11/2006 | Saruta et al. | 347/9 |
| 2008/0079585 | A1 | 4/2008 | Hirota et al. | |
| 2008/0088685 | A1 | 4/2008 | Lucas et al. | |
| 2008/0106556 | A1 | 5/2008 | Chan | |
| 2009/0122124 | A1 | 5/2009 | Takei | |

FOREIGN PATENT DOCUMENTS

| JP | 11-243465 A | 9/1999 |
| JP | 2001-075435 A | 3/2001 |
| JP | 2003-216710 A | 7/2003 |
| JP | 2004-272540 A | 9/2004 |
| JP | 2005-115640 A | 4/2005 |
| JP | 2005-210310 A | 8/2005 |
| JP | 2007-323002 A | 12/2007 |
| JP | 2008-094095 A | 4/2008 |

OTHER PUBLICATIONS

Extended European Search Report dated Jun. 12, 2012 for the corresponding European Patent Application No. 11159560.9.

* cited by examiner

*Primary Examiner* — Jason Uhlenhake
(74) *Attorney, Agent, or Firm* — Global IP Counselors, LLP

(57) ABSTRACT

An electronic instrument is adapted to communicate with another electronic instrument. The electronic instrument includes an acquisition section, a storage section, an inquiry section and a processing section. The acquisition section is configured to acquire identification information from a managed article used by the electronic instrument, the identification information being read-only information uniquely assigned to the managed article. The storage section is configured to store the identification information acquired by the acquisition section. The inquiry section is configured to inquire another electronic instrument as to whether the identification information acquired by the acquisition section is already stored in another electronic instrument. The processing section is configured to perform processing in response to a result of inquiry by the inquiry section.

19 Claims, 6 Drawing Sheets

| Cartridge ID | State Information | | Update Time |
|---|---|---|---|
| | Ink Level | Error Information | |
| Cxxxxxx1 | 10% | Ink Blockage | Year/Month/Day/Time |
| ⋮ | ⋮ | ⋮ | ⋮ |
| | | | |
| | | | |
| | | | |
| | | | |
| | | | |
| | | | |
| | | | |

ELECTRONIC INSTRUMENT AND MANAGEMENT METHOD

CROSS-REFERENCE TO RELATED APPLICATIONS

This application claims priority to Japanese Patent Application No. 2010-067459 filed on Mar. 24, 2010 and Japanese Patent Application No. 2010-067461 filed on Mar. 24, 2010. The entire disclosures of Japanese Patent Application Nos. 2010-067459 and 2010-067461 are hereby incorporated herein by reference.

BACKGROUND

1. Technical Field

The present invention relates to a technique for managing an ink cartridge or the like installed in a printer, or for managing another managed article used in an electronic instrument.

2. Related Art

In conventional ink cartridges (including toner cartridges; the same hereinafter) for installation in a printer, a memory IC or other writable storage device is sometimes provided (see Japanese Laid-Open Patent Application Publication No. 2003-216710 and Japanese Laid-Open Patent Application Publication No. 2005-115640, for example). A serial number, manufacturer ID, and other information of the ink cartridge, for example, are recorded in the storage device. Information indicating the ink level, the start time of use of the ink cartridge, and other information is also sometimes written in the storage device by the printer in which the ink cartridge is installed. By using these items of information, the printer can manage individual ink cartridges.

However, the writable storage device is an electronic component, and is therefore generally expensive, and this high cost hinders efforts to lower the cost of the ink cartridge. There is therefore a need for a technique whereby individual ink cartridges can be managed without mounting a writable storage device. The need for such a technique is not limited to use in ink cartridges, and the same need exists for a technique of managing individual managed articles that are used by an electronic instrument.

SUMMARY

In view of the foregoing, an object of the present invention is to provide a technique whereby managed articles used in an electronic instrument can be individually managed without providing a writable storage device to the objects.

The present invention for overcoming at least some of the problems described above can be realized by the embodiments or application examples described below.

An electronic instrument according to a first aspect of the present invention is adapted to communicate with another electronic instrument. The electronic instrument includes an acquisition section, a storage section, an inquiry section and a processing section. The acquisition section is configured to acquire identification information from a managed article used by the electronic instrument, the identification information being read-only information uniquely assigned to the managed article. The storage section is configured to store the identification information acquired by the acquisition section. The inquiry section is configured to inquire another electronic instrument as to whether the identification information acquired by the acquisition section is already stored in another electronic instrument. The processing section is configured to perform processing in response to a result of inquiry by the inquiry section.

The term "read-only information" used above refers to information which cannot be written by the electronic instrument, and includes information which can be written by using a separate device, or information to which a clear-all function can be applied. In the managed article used by the electronic instrument configured as described above, identification information specific to the managed article is recorded in non-writable or non-rewritable fashion, and the electronic instrument optically or non-optically reads the identification information from the managed article and queries another electronic instrument. Therefore, individual managed articles can be identified and managed without providing a writable storage device to the managed articles. In the electronic instrument configured as described above, a query is made to another electronic instrument as to whether the identification information read from the managed article is already stored. In a case in which a determination is made by this query that the identification information read from the managed article is already stored by the other electronic instrument, the determination can be made that the managed article was being used in the other electronic instrument. It is therefore possible for the electronic instrument configured as described above, together with the other electronic instrument, to manage whether the managed article has already been used by the other electronic instrument. A printer, for example, may be applied as the electronic instrument, and an ink cartridge (including a cartridge for toner ink) or printing medium, for example, may be applied as the managed article.

An electronic instrument according to a second aspect of the present invention is adapted to communicate with another electronic instrument. The electronic instrument includes an acquisition section, a storage section, an inquiry section and a processing section. The acquisition section is configured to acquire identification information from an item accompanying a managed article used by the electronic instrument, the identification information being read-only information uniquely assigned to the managed article. The storage section is configured to store the identification information acquired by the acquisition section. The inquiry section is configured to inquire another electronic instrument as to whether the identification information acquired by the acquisition section is already stored in another electronic instrument. The processing section is configured to perform processing in response to a result of inquiry by the inquiry section.

As in this configuration, a configuration may be adopted in which the identification information is recorded in an accompanying item to the managed article. In this case, a printer, for example, may be applied as the electronic instrument; ink (including toner) or a printing medium, for example, may be applied as the managed article; and an ink cartridge (including a cartridge for toner ink), a spool for winding a printing medium, or a package or included item for the ink or printing medium, for example, may be applied as the accompanying item. A printer, for example, may be applied as the electronic device; an ink cartridge (including a cartridge for toner ink), for example, may be applied as the managed article; and a package or included item for the ink cartridge, for example, may be applied as the accompanying item.

An electronic instrument according to a third aspect is the electronic instrument according to the first or second aspect, preferably further including a state detection section configured to detect a state of the managed article used by the electronic instrument. The storage section is configured to associate and store the identification information acquired by the acquisition section and state information which indicates the state of the managed article detected by the state detection section. The processing section is configured to acquire the state information associated with the identification information acquired by the acquisition section from the another electronic instrument, as the processing performed by the processing section when the identification information acquired by the acquisition section is already stored in the another electronic instrument.

Through such a configuration, information (e.g., information indicating the ink level, error information, or the amount of time elapsed since the start of use; in the present application, the "ink level" is assumed to include the "ink usage amount," which indirectly indicates the ink level; the "ink level" may also mean the remaining weight or remaining volume of ink, or the remaining time until the expiration date of the ink) indicating the state of the managed article can be passed on from another electronic instrument which had previously been using the managed article.

An electronic instrument according to a fourth aspect is the electronic instrument according to the third aspect, wherein the state detection section is preferably configured to detect one of a used amount and a remaining amount of the managed article as the state of the managed article, and the processing section is preferably further configured to set an initial value of the one of the used amount and the remaining amount based on the one of the used amount and the remaining amount included in the state information acquired from the another electronic instrument, as the processing performed by the processing section when the identification information acquired by the acquisition section is already stored in the another electronic instrument.

Through such a configuration, the used amount of the managed article detected by the other electronic instrument can be passed on, and the used amount can be accurately detected even when the same managed article is used in different electronic instruments.

An electronic instrument according to a fifth aspect is the electronic instrument according to the fourth aspect, wherein the state detection section is preferably further configured to transmit the used amount of the managed article to an external accounting server to cause the accounting server to perform accounting in accordance with the used amount of the managed article.

Through such a configuration, the accounting server can be made to perform accurate accounting based on the used amount of the managed article acquired from the other electronic instrument.

An electronic instrument according to a sixth aspect is the electronic instrument according to the third aspect, wherein the state detection section is preferably configured to detect an error relating to the managed article as the state of the managed article, and the processing section is preferably further configured to determine whether the state detection section has detected an error that is the same as an error included in the state information acquired from the another electronic instrument, as the processing performed by the processing section when the identification information acquired by the acquisition section is already stored in the another electronic instrument.

Through such a configuration, the location at which an error occurs (e.g., whether the error occurs in the managed article as such, or on the electronic instrument side) can be analyzed based on whether an error that is the same as the error included in the received state information is also detected by the detection section.

Besides the configuration as an electronic instrument described above, the present invention can be configured as a method or computer program whereby one electronic instrument among a plurality of electronic instruments capable of communicating with each other communicates with another electronic instrument; a management system provided with a plurality of electronic instruments; or a method for managing a managed article in a management system. The computer program may be recorded on a recording medium which is readable by computer. Examples of recording media that can be used include flexible disks, CD-ROM, DVD-ROM, magneto-optical disks, memory cards, hard disks, and various other media. The electronic instrument may be configured so that a plurality of devices such as printers and computers which perform a printer driver operation share functions, and the plurality of devices functions in cooperation with each other.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the present invention will be described hereinafter in the following order based on embodiments: A. System Configuration; B. Configuration of the Printer; C. State Information Acquisition Processing; D. Error Analysis Processing; and E. Modifications.

A. System Configuration

Figure 1:
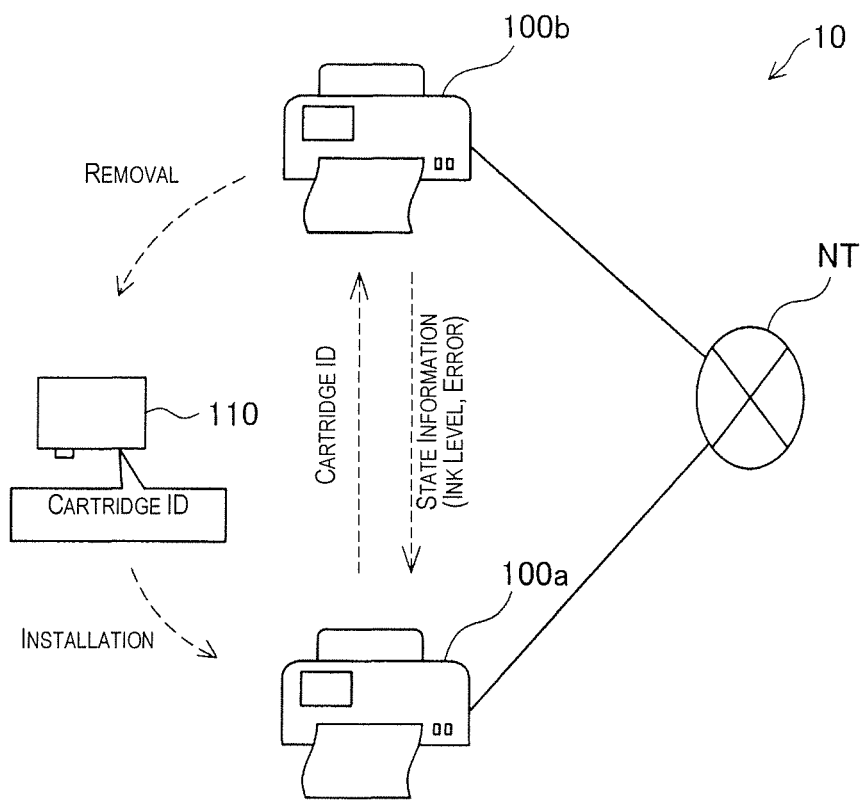
FIG. 1 is a view showing the overall configuration of a managed-object management system which includes printers as an embodiment of the present invention.

FIG. 1 is a view showing the overall configuration of a managed-object management system which includes printers as an embodiment of the present invention. A first printer 100*a* and a second printer 100*b* are connected via a network NT, and the managed-object management system 10 is thereby formed. The managed-object management system 10 is a system for managing a state (an ink level or an error) of an ink cartridge 110, which is a consumable good used by the first printer 100*a* or the second printer 100*b*. The first printer 100*a* and the second printer 100*b* each have the same configuration, and will therefore be generically described as the "printer 100" hereinafter. The printer 100 corresponds to the "electronic instrument" of the present application, and the ink cartridge 110 corresponds to the "managed article" of the present application. Two printers 100 are shown in FIG. 1, but the managed-object management system 10 may be provided with three or more printers 100. The network NT may be a LAN (Local Area Network), a WAN (Wide Area Network), or the Internet.

The printers 100 in the present embodiment each use the ink cartridge 110 in common. In other words, the ink cartridge 110 which has been removed from the second printer 100b can be installed in the first printer 100a for continued use. Identification information (referred to hereinafter as a "cartridge ID") specific to the ink cartridge 110 is assigned to the ink cartridge 110. The cartridge ID is invisibly recorded on a security label which is affixed to the ink cartridge 110 (this process will be described in detail hereinafter).

For example, when the ink cartridge 110 is installed in the first printer 100a, the first printer 100a reads the cartridge ID from the ink cartridge 110 and queries the second printer 100b for the cartridge ID. When the query for the cartridge ID is received from the first printer 100a, the second printer 100b determines whether the cartridge ID is already stored. When the cartridge ID is already stored, the second printer 100b transmits the ink level of the ink cartridge 110 or error information relating to the ink cartridge 110 as state information to the first printer 100a. The first printer 100a in which the ink cartridge 110 is newly installed can thereby inherit the information indicating the state of the ink cartridge 110 from the second printer 100b which had previously been using the ink cartridge 110. In the present embodiment, the plurality of printers 100 thus exchange the cartridge ID with each other, and the states of individual ink cartridges 110 can thereby be individually managed. The configuration of the printers 100 and the processing specifics will be described in detail hereinafter.

B. Configuration of the Printer

Figure 2:
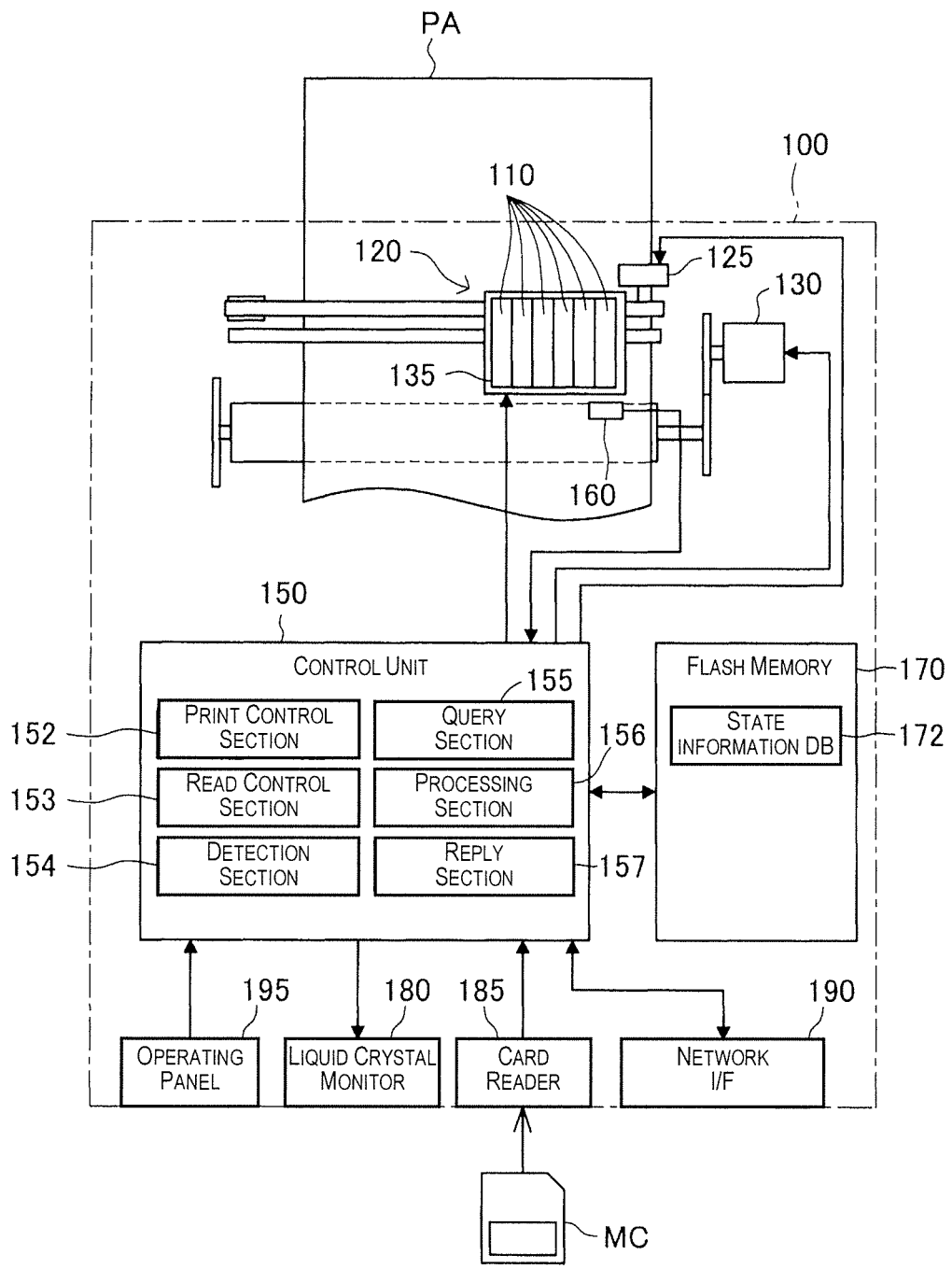
FIG. 2 is a view showing the internal configuration of the printer.

FIG. 2 is a view showing the internal configuration of the printer 100. The printer 100 is provided with a carriage 120 in which ink cartridges 110 accommodating cyan, magenta, yellow, and other ink are installed; a carriage motor 125 for driving the carriage 120 in a primary scanning direction; a paper feed motor 130 for conveying printing paper PA in a secondary scanning direction; a print head 135 for discharging ink fed from the ink cartridges 110, the print head 135 being mounted on the carriage 120; a control unit 150 for controlling the abovementioned components; and a scanner 160 for optically reading the cartridge ID from the security label which is affixed to each ink cartridge 110. The scanner 160 is composed of a light source for emitting ultraviolet rays, and a CCD image sensor.

Figures 3, 4:
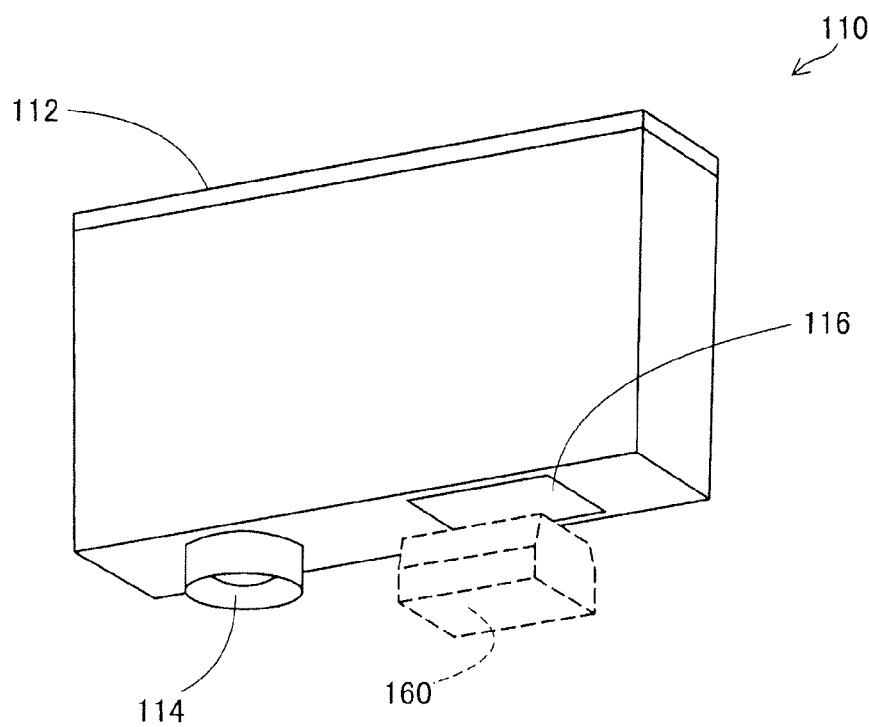
FIG. 3 is a perspective view showing the ink cartridge at an angle from the bottom side thereof.
FIG. 4 is a view showing an example of the state information database.

FIG. 3 is a perspective view showing the ink cartridge 110 at an angle from the bottom side thereof. The ink cartridge 110 is provided with a container body 112 in which ink is accommodated, and an ink feeding port 114 for feeding the ink to the print head 135. A security label 116 is affixed to the bottom surface of the container body 112, and printing formed by a combination of an overt technique and a covert technique is applied to the surface of the security label 116. Specifically, a logo of the manufacturer of the ink cartridge 110 is printed on a portion of the surface of the security label 116 through the use of a color shifting ink whose color changes according to the viewing angle, and on another portion of the surface of the security label 116, the cartridge ID of the ink cartridge 110 is printed invisibly through the use of fluorescent ink which is made visible by ultraviolet irradiation. When the ink cartridge 110 is installed in the carriage 120, the ink cartridge 110 is conveyed by the carriage motor 125 to a position facing the scanner 160 which is provided inside the printer 100. Ultraviolet rays are then radiated by the light source (black light) provided in the scanner 160, fluorescence from the security label 116 is detected by the image sensor in the scanner 160, and the cartridge ID is thereby read.

A liquid crystal monitor 180 for displaying an operating screen; a card reader 185 for reading data (referred to hereinafter as "data for printing") which are to be printed from a memory card MC; a network interface 190 for receiving communication with another printer 100 or data for printing from other instruments; an operating panel 195 for receiving operations from the user; and a flash memory 170 in which a state information database 172 is stored are connected to the control unit 150 (FIG. 2).

FIG. 4 is a view showing an example of the state information database 172 stored in the flash memory 170. In the state information database 172, the ink level of an ink cartridge 110 and error information relating to the ink cartridge 110 are recorded as state information in association with the cartridge ID of the ink cartridge 110 that is installed in the printer 100. The update time at which these items of information were most recently recorded is also recorded in the state information database 172. Examples of error information relating to the ink cartridge 110 include ink blockage errors or installation errors.

The control unit 150 (FIG. 2) is configured as a computer provided with a CPU and memory. The CPU functions as the print control section 152, read control section 153, detection section 154 (state detection section), query section 155, processing section 156, and reply section 157 shown in the drawing, by executing a predetermined program stored in the memory.

The print control section 152 has a function for controlling the carriage motor 125, the paper feed motor 130, and the print head 135, so as to print on the printing paper PA based on the data for printing which are read from the memory card MC, or the data for printing which are received through the network interface 190.

The read control section 153 has a function for controlling the scanner 160 so as to read the cartridge ID from the security label that is affixed to the ink cartridge 110. The read control section 153 records the read cartridge ID in the state information database 172 in the flash memory 170. At this time, the read control section 153 records the time at which the cartridge ID was recorded as the update time in the state information database 172. All cartridge IDs which have been read by the read control section 153 are accumulated in the state information database 172.

The detection section 154 estimates the amount of ink remaining in the ink cartridge 110. Specifically, the detection section 154 computes the ink usage amount according to the number of times the print head 135 has been driven by the print control section 152, and detects (estimates) the amount of ink remaining in the ink cartridge 110 by subtracting the used amount from a predetermined maximum amount of ink. The amount of ink may also be detected (estimated) from the resonance frequency by oscillating the ink inside the ink cartridge 110, or by such other means as measuring the hydraulic pressure of the ink inside the ink cartridge 110. The detection section 154 appropriately records the detected ink level in the state information database 172 in the flash memory 170. At this time, the detection section 154 records the time at which the ink level was recorded as the update time in the state information database 172. In a case in which an ink level is acquired from another printer 100 by the state information acquisition processing described hereinafter, the detection section 154 detects the ink level by setting the acquired ink level as an initial value and continually subtracting the ink usage amount, which corresponds to the number of times the print head 135 is driven, from the initial value.

The detection section 154 also detects errors relating to the ink cartridge 110, such as ink blockage errors or installation errors. For example, the detection section 154 causes the print control section 152 to print a predetermined nozzle check pattern in response to an instruction from the user through the operating panel 195, and receives an specification from the user as to a color that is not printed. The absence of a printed color indicates an ink blockage error. When an error is detected, the detection section 154 associates the type of error with the cartridge ID and records the type of error in the state information database 172 in the flash memory 170. At this time, the print control section 152 records the time at which the error information was recorded as the update time in the state information database 172. The detection section 154 can also determine that errors other than ink blockage have occurred. For example, the detection section 154 can determine that an installation error has occurred in a case in which the scanner 160 is unable to read the cartridge ID (such as in a case in which several attempts are made before the cartridge ID is successfully read).

The query section 155 has a function for querying another printer 100 through the network NT as to the cartridge ID read by the read control section 153.

The processing section 156 has a function for determining whether the ink cartridge 110 attached to the printer 100 has already been used by another printer 100 (or by the printer 100 to which the ink cartridge 110 is attached), according to the result of the query by the query section 155. The processing section 156 also has a function for acquiring the state information from the printer 100, and the function of analyzing the error included in the acquired state information in a case in which the ink cartridge 110 attached to the printer 100 has already been used by another printer 100 (or by the printer 100 to which the ink cartridge 110 is attached).

The reply section 157 is provided with a function for referencing the state information database 172 in a case in which a query for the cartridge ID is received from the other printer 100, and determining whether the queried cartridge ID is present, and a function for replying with the state information that corresponds to the cartridge ID.

C. State Information Acquisition Processing

Figure 5:
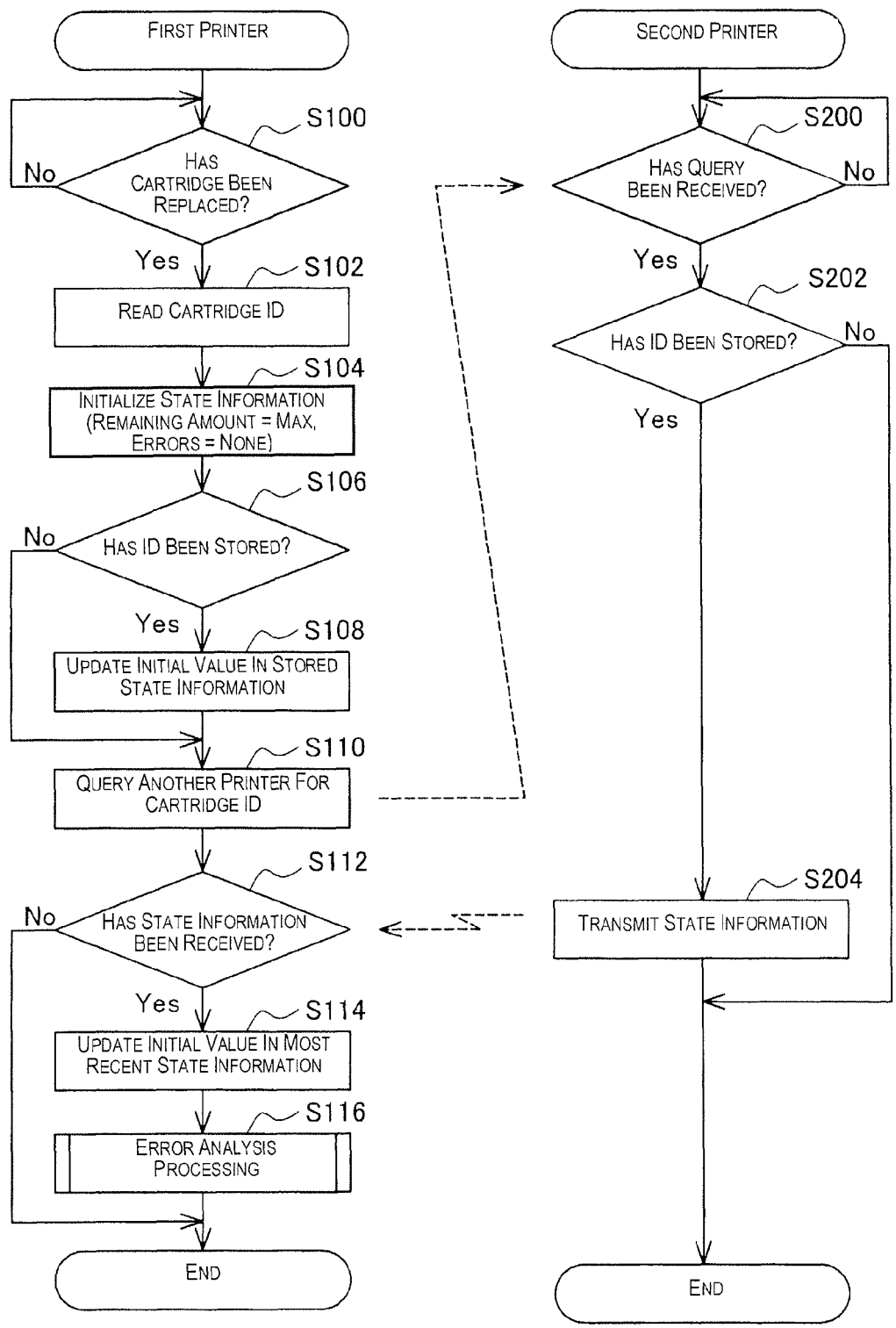
FIG. 5 is a flowchart showing the state information acquisition processing.

FIG. 5 is a flowchart showing the state information acquisition processing executed between the printer 100 in which the ink cartridge 110 is installed and the other printer 100. A case is described herein in which an ink cartridge 110 that is removed from the second printer 100b is installed in the first printer 100a. In this processing, the control unit 150 of the first printer 100a first determines whether the ink cartridge 110 has been replaced (step S100). The control unit 150 can determine that the ink cartridge 110 has been replaced when a predetermined button (e.g., the "replacement-completed button") in the operating panel 195 is pressed.

In a case in which the determination is made that the ink cartridge 110 has been replaced, the scanner 160 in the first printer 100a is controlled by the read control section 153, and the cartridge ID recorded on the security label 116 of the replacement ink cartridge 110 is read (step S102). When the cartridge ID is read, the control unit 150 of the first printer 100a initializes the state information that corresponds to the cartridge ID, through the use of the processing section 156 (step S104). Specifically, the ink level is set to "100%," and the error information is set to "no errors." However, in a case in which several attempts are made before the cartridge ID is successfully read, the error information is set to "installation error."

When the state information is initialized, the control unit 150 of the first printer 100a determines, through the use of the processing section 156, whether the cartridge ID read in step S102 is already recorded in the state information database 172 (step S106). In a case in which the cartridge ID read in step S102 is already recorded in the state information database 172, the processing section 156 of the first printer 100a reads the state information that corresponds to the cartridge ID from the state information database 172, and uses the state information to update the state information that was initialized in step S104 (step S108). By this operation, in a case in which the ink cartridge 110 installed at this time has previously been used by the first printer 100a, it is possible to continue using the state information that was recorded at the time of previous use. On the other hand, in a case in which the cartridge ID read in step S102 is not recorded in the state information database 172, the processing section 156 of the first printer 100a skips the processing of step S108.

Through the use of the query section 155, the control unit 150 of the first printer 100a then queries all of the other printers 100 connected to the network NT for the cartridge ID that was read in step S102 (step S110).

When the other printer 100 (second printer 100b) receives the query for the cartridge ID from the first printer 100a (step S200), the other printer 100 (second printer 100b) determines whether the queried cartridge ID is recorded in the state information database 172 of the other printer 100 (second printer 100b) (step S202). In a case in which the queried cartridge ID is recorded in the state information database 172 of the other printer 100 (second printer 100b), the state information and update time information that correspond to the cartridge ID are transmitted by the reply section 157 to the first printer 100a from which the query originated (step S204). In a case in which the cartridge ID queried from the first printer 100a is not recorded in the state information database 172 of the other printer 100 (second printer 100b), the state information or update time information is not transmitted.

The processing section 156 of the first printer 100a determines whether the state information and the update time information have been received within a predetermined timeout time (e.g., 30 seconds) from the other printer 100 (second printer 100b) (step S112). In a case in which the state information and the update time information have been received from the other printer 100 within the predetermined timeout time, the processing section 156 determines whether the newly installed ink cartridge 110 has already been used by the other printer 100. In this case, the processing section 156 of the first printer 100a uses the state information received in step S112 to update the state information that was initialized in step S104 (or the state information that was updated in step S108) (step S114). However, in a case in which state information was acquired from the state information database 172 of the first printer 100a in step S108, updating is not performed when the received state information is older than the acquired state information. In step S112, in a case in which state information and update time information are received from a plurality of other printers 100, processing is performed based on the plurality of sets of state information and update time information. Specifically, the state information that was initialized in step S104 (or the state information that was updated in step S108) is updated by the newest state information among the information received from the plurality of other printers 100. However, in this case as well, in a case in which state information was acquired from the state information database 172 of the first printer 100a in step S108, the update is not performed when any of the received state information is older than the acquired state information. When the processing of step S114 is completed, the processing section 156 of the first printer 100a executes the error analysis processing described hereinafter (step S116), and ends the state information acquisition processing. In step S112, in a case in which the state information or update time is not received from the other printer 100 within the predetermined timeout time, the processing section 156 determines that the newly installed ink cartridge 110 has not been used by the other printer 100, and the state information acquisition processing is ended without further progress.

The processing of step S110 and subsequent steps may be periodically executed, and not only at the time at which the ink cartridge 110 is replaced. Through this configuration, even when the other printer is not connected to the network NT at the time that the ink cartridge 110 is replaced, state information from the other printer can be acquired when the other printer is subsequently connected to the network NT. In this case, the state information that was initialized in step S104 (or the state information that was updated in step S108) is updated based on the subsequently acquired state information. This updating is preferably performed so as to add the difference of the subsequently acquired used amount and the used amount from the time of initialization prior to the acquisition to the current used amount in a case in which the subsequently acquired used amount is greater than the used amount from the time of initialization prior to the acquisition, for example. A configuration may also be adopted in which the processing of step S110 and subsequent steps is periodically executed only in a case in which the first printer 100a has not changed the state information of the first printer 100a.

D. Error Analysis Processing

Figure 6:
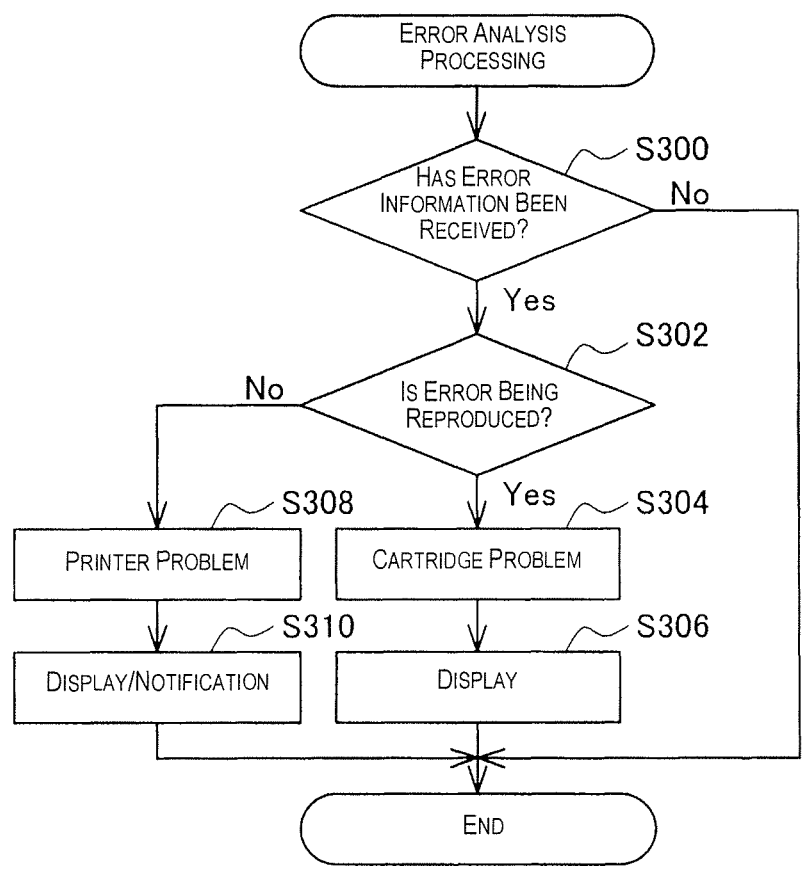
FIG. 6 is a flowchart showing the error analysis processing.

FIG. 6 is a detailed flowchart showing the error analysis processing executed in step S116 of the state information acquisition processing described above. The error analysis processing is processing for analyzing the error information acquired in the state information acquisition processing described above.

When the error analysis processing is executed, the processing section 156 of the first printer 100a determines whether error information is included in the state information received from the other printer 100 in step S112 of the state information acquisition processing described above (step S300). When error information is not included, the processing section 156 ends the error analysis processing. When error information is included, the processing section 156 verifies whether the error is reproduced in the first printer 100a as well (step S302). Specifically, in a case in which an ink blockage error is included in the received state information, for example, the processing section 156 issues an instruction to the detection section 154, causes a predetermined nozzle check pattern to be printed, and receives a specification from the user as to the color that is being blocked. It is thereby possible to verify whether ink blockage will occur as well in the first printer 100a in which the ink cartridge 110 is newly installed. In a case in which an installation error indicating a problem in the installation state of the ink cartridge 110 is included in the received state information, for example, the processing section 156 verifies whether an installation error has been detected by the detection section 154.

In a case in which the error included in the received state information is verified as being reproduced in the first printer 100a as well, the processing section 156 of the first printer 100a determines that the error is occurring in the installed ink cartridge 110 as such (step S304), and provides a display to this effect on the liquid crystal monitor 180 (step S306). In a case in which the error is not reproduced in the first printer 100a, a determination is made that the error is occurring in the second printer 100b (e.g., in the print head 135 or the carriage 120 of the second printer 100b) which detected the error (step S308), and a display to this effect is provided on the liquid crystal monitor 180. The same display is also issued to the second printer 100b to which the error is transmitted (step S310). When the sequence of processing described above ends, the error analysis processing is completed.

When the ink cartridge 110 is newly installed in the printer 100 of the present embodiment described above, the printer 100 reads the cartridge ID from the security label 116 which is affixed to the ink cartridge 110, and queries the other printer. It is therefore possible to determine, according to the result of the query, whether the newly installed ink cartridge 110 has already been used by the other printer. In a case in which the newly installed ink cartridge 110 has already been used in the other printer, since the state information of the ink cartridge 110 is transmitted from the printer, the printer 100 in which the ink cartridge 110 is newly installed can continue to utilize the ink level or error information from the previous printer. Therefore, through the printer 100 of the present embodiment, even when the same ink cartridge 110 is used in common with another printer, the ink level or error information of the ink cartridge 110 can be accurately tracked. Furthermore, since the ink level or error information is acquired from the other printer in the present embodiment, there is no need to provide an ink level sensor or a storage device to the ink cartridge 110 as such, and the ink cartridges can be managed merely by affixing the security label 116 to the ink cartridge 110. The manufacturing cost of the ink cartridge 110 can therefore be markedly reduced.

In a case in which the printer 100 of the present embodiment inherits error information from the other printer, the printer 100 analyzes whether the error is reproduced in the printer 100 as well. It is therefore possible to determine, based on this analysis, whether the error is caused by a defect in the ink cartridge 110 or a defect in the printer body.

E. Modifications

An embodiment of the present invention is described above, but the present invention is not limited to such an embodiment, and various configurations may be adopted within the intended scope of the present invention. For example, functions which are realized by software may also be realized by hardware. Such other modifications or combinations thereof as are described hereinafter are also possible.

Modification 1

In the embodiment described above, the printer 100 stores state information and update time information, and transmits and receives these items of information, but the information stored, transmitted, and received may be state information only, or ink level information only. Since the update time can be estimated to be more recent the lower the ink level is, in a case in which the ink level stored by one printer is less than the ink level acquired from the other printer 100, it is possible to determine that the ink level stored by the one printer is the most recent ink level, and the ink level acquired from the other printer 100 need not be reflected. The remaining weight or remaining volume of ink is also managed in the above embodiment as at least a portion of state information as the ink level, but the ink level may also be managed as the remaining time until the expiration date of the ink. In a case in which heating occurs during use of the ink, and the ink degrades when heating is prolonged, for example, it is preferred that management relate to at least any of the usage period, remaining time, and heating time of the ink.

Modification 2

Figure 7:
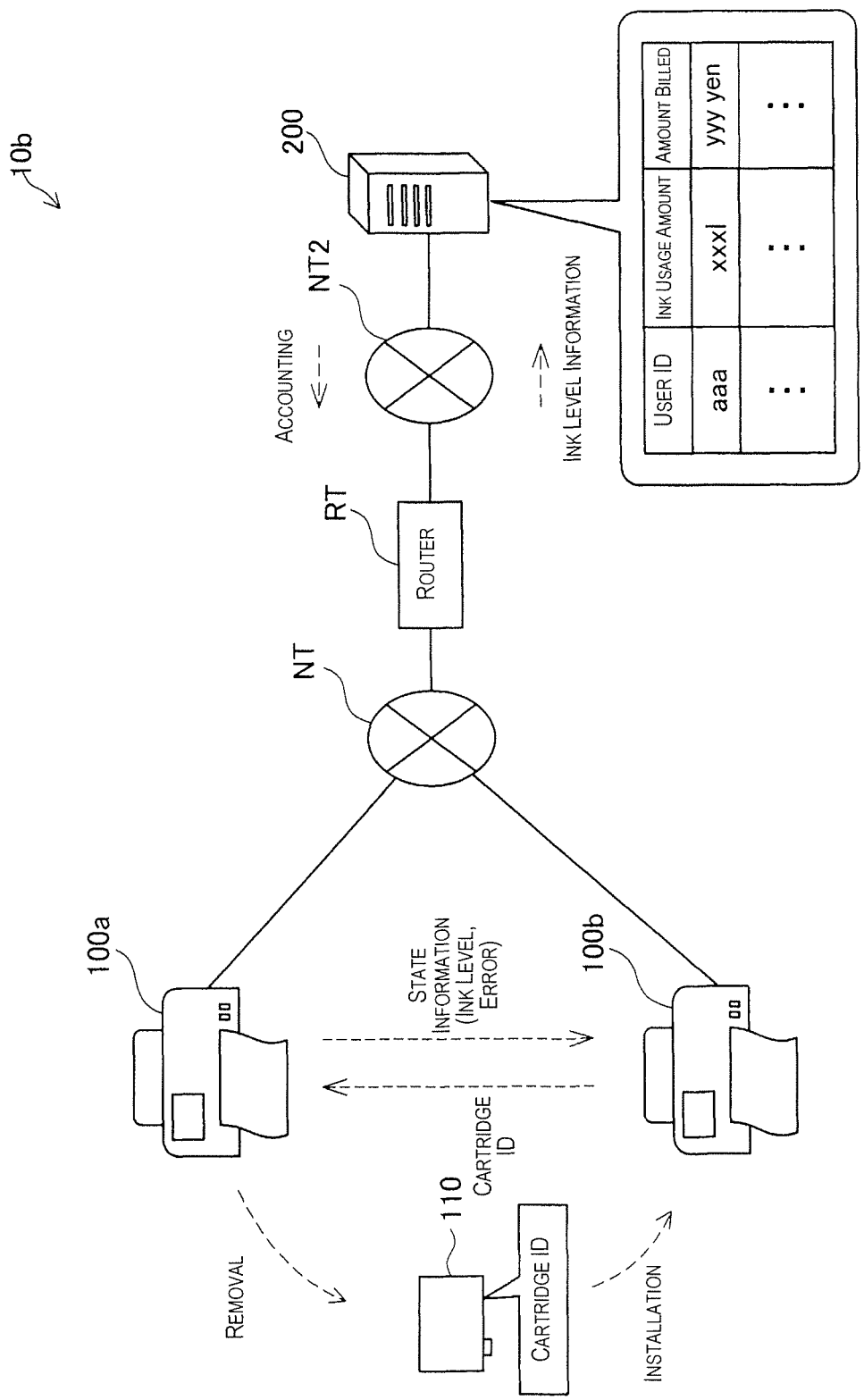
FIG. 7 is a view showing another embodiment of the managed-object management system.

FIG. 7 is a view showing another embodiment of the managed-object management system. In the managed-object management system 10b in the present modification, the network NT to which the first printer 100a and the second printer 100b are connected is connected to the Internet NT2 via a router RT. An accounting server 200 is connected to the Internet NT2. In the present modification, each printer 100 appropriately notifies the accounting server 200 of the ink level detected by the processing section 156. The accounting server 200 calculates an ink usage amount based on the ink level received from each printer 100, and performs accounting for each user according to the ink usage amount. As described above, a storage device is not provided to the ink cartridges 110 used by the printers 100, but the printers 100 can manage the remaining amount of ink by querying each other for the cartridge ID. Therefore, accounting can be accurately performed for each user even in a system in which the accounting is based on the used amount of ink, as in the present modification.

Modification 3

In the embodiment described above, the printer 100 as a unit gives and receives a cartridge ID or state information. However, a portion of the functions (e.g., the functions of the detection section 154, the query section 155, the processing section 156, and the reply section 157) provided to the printer 100 may be realized by a personal computer which is connected to the printer 100, and the state information database 172 may be stored by a storage device within the personal computer. In this case, the combination of the printer 100 and the personal computer corresponds to the "electronic instrument" of the present application. A configuration may also be adopted in which the state information database 172 is stored in a server with which the printer 100 can communicate, the printer 100 queries the server for the cartridge ID when the cartridge is replaced, notification is issued from the printer 100 to the server in accordance with ink use or the like, and the state information database 172 is updated.

Modification 4

In the embodiment described above, the cartridge ID is recorded on the security label 116 through the use of fluorescent ink which reacts to ultraviolet rays, the security label 116 being affixed to the ink cartridge as a portion thereof. However, the cartridge ID may be recorded by printing on the security label 116 with infrared-absorbing (or reflecting) ink, liquid crystal ink, or various other types of invisible ink. Moreover, in a security label printed by ink (e.g., color shifting ink or the like) which can be read through a polarizing plate, or a security label fabricated by a technique in which a surface treatment for refracting light is applied by an optical technique rather than a printing technique, and the label can be read through a polarizing plate, the security label can be read by placing a polarizing plate between the security label 116 and the read surface of the scanner 160. The security label 116 may also be recorded on by a magnetic stripe or the like and read by non-optical means. The cartridge ID may also be recorded in encoded form on the security label 116, and decoded when read by the printer 100. The security label 116 is also not limited to being on the bottom surface of the ink cartridge 110, and may be affixed in any position. Printing of a logo (overt printing) by color shifting ink may also be omitted. In a case in which the cartridge ID is set directly in the position in which the ink cartridge 110 is used, rather than on the security label 116, the cartridge ID may be formed (printed or recorded) in a position of the ink cartridge 110 so as to face the scanner, or may be formed (printed or recorded) on an accompanying item to the ink cartridge 110 that is not in the form of a label. The cartridge ID may also be formed (printed or recorded) on an accompanying item to the ink cartridge 110, such as a box used as a package for sale of the ink cartridge 110, or an operating manual or identification card included at the time of sale.

Modification 5

In the embodiment described above, the printer 100 is applied as the electronic instrument of the present application, and the ink cartridge 110 is applied as the managed article of the present application. However, the electronic instrument and the managed article are not thus limited. The ink as such may be applied as the managed article. Printing media such as photographic paper, printing film, or roll paper, for example, may also be applied as the managed article, security labels may be affixed to these printing media, or a security label may be affixed to the spool of a roll-paper-shaped printing medium. The printer 100 can thereby distinguish the type, characteristics, size, number of sheets used, and other properties of the printing paper, for example, based on the information recorded on the security label. Besides a printer 100, an instrument such as a personal computer or a DVD recorder can also be applied as the electronic instrument of the present application. In this case, a CD-R, DVD-RW, memory card, or other recording media can be applied as the managed article.

Modification 6

Due to increased environmental conservation awareness of users in recent years, recycling operations for recovering used ink cartridges have become an important business activity. In cases in which used ink cartridges 110 are recovered by the manufacturer or delivery company, environmental points or other points can be imparted to the user. Environmental points or the like can also be added in the same manner for recovery not only of ink cartridges 110, but also DVD-R media and the like for which writing has failed, and used recording media.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An electronic instrument adapted to communicate with a second electronic instrument, the electronic instrument comprising:
    an acquisition section configured to acquire identification information from a managed article installed in the electronic instrument, the identification information being read-only information uniquely assigned to the managed article, the managed article being installed in the second electronic instrument before being installed in the electronic instrument;
    a storage section configured to store the identification information acquired by the acquisition section;
    a state detection section configured to detect an error relating to the managed article used by the electronic instrument,
    an inquiry section configured to inquire the second electronic instrument as to whether the identification information acquired from the managed article installed in the electronic instrument by the acquisition section is already stored in the second electronic instrument; and
    a processing section configured to perform processing in response to a result of inquiry by the inquiry section,
    the storage section being configured to associate and store the identification information acquired by the acquisition section and state information which indicates the error relating to the managed article detected by the state detection section, and
    the processing section being further configured to verify whether the error is reproduced in the electronic instrument when the state information includes error information indicating that the error occurred in the second electronic instrument.

2. The electronic instrument according to claim 1, wherein the processing section is configured to acquire the state information associated with the identification information acquired by the acquisition section from the second electronic instrument, as the processing performed by the processing section when the identification information acquired by the acquisition section is already stored in the second electronic instrument.

3. The electronic instrument according to claim 2, wherein the state detection section is further configured to detect one of a used amount and a remaining amount of the managed article as the state information, and
    the processing section is further configured to set an initial value of the one of the used amount and the remaining amount based on the one of the used amount and the remaining amount included in the state information acquired from the second electronic instrument, as the processing performed by the processing section when the identification information acquired by the acquisition section is already stored in the second electronic instrument.

4. The electronic instrument according to claim 3, wherein the state detection section is further configured to transmit the used amount of the managed article to an external accounting server to cause the accounting server to perform accounting in accordance with the used amount of the managed article.

5. The electronic instrument according to claim 2, wherein the processing section is further configured to determine whether the state detection section has detected an error that is the same as an error included in the state information acquired from the second electronic instrument, as the processing performed by the processing section when the identification information acquired by the acquisition section is already stored in the second electronic instrument.

6. The electronic instrument according to claim 1, wherein the managed article is one of an ink cartridge and a printing medium, and
    the electronic instrument is a printer including a printing section configured to perform printing using the one of the ink cartridge and the printing medium.

7. The electronic instrument according to claim 1, wherein the identification information is optically-readable invisible information.

8. The electronic instrument according to claim 1, further comprising
    a read control section configured to control a scanner so as to read the identification information, wherein
    all identification information which has been read by the read control section is accumulated in a state information database.

9. An electronic instrument adapted to communicate with a second electronic instrument, the electronic instrument comprising:
    an acquisition section configured to acquire identification information from an item accompanying a managed article installed in the electronic instrument, the identification information being read-only information uniquely assigned to the managed article, the managed article being installed in the second electronic instrument before being installed in the electronic instrument;
    a storage section configured to store the identification information acquired by the acquisition section;
    a state detection section configured to detect an error relating to the managed article used by the electronic instrument,
    an inquiry section configured to inquire the second electronic instrument as to whether the identification information acquired from the managed article installed in the electronic instrument by the acquisition section is already stored in the second electronic instrument; and
    a processing section configured to perform processing in response to a result of inquiry by the inquiry section,
    the storage section being configured to associate and store the identification information acquired by the acquisition section and state information which indicates the error relating to the managed article detected by the state detection section, and
    the processing section being further configured to verify whether the error is reproduced in the electronic instrument when the state information includes error information indicating that the error occurred in the second electronic instrument.

10. The electronic instrument according to claim 9, wherein
    the processing section is configured to acquire the state information associated with the identification information acquired by the acquisition section from the second electronic instrument, as the processing performed by the processing section when the identification information acquired by the acquisition section is already stored in the second electronic instrument.

11. The electronic instrument according to claim 10, wherein
the state detection section is further configured to detect one of a used amount and a remaining amount of the managed article as the state information, and
the processing section is further configured to set an initial value of the one of the used amount and the remaining amount based on the one of the used amount and the remaining amount included in the state information acquired from the second electronic instrument, as the processing performed by the processing section when the identification information acquired by the acquisition section is already stored in the second electronic instrument.

12. The electronic instrument according to claim 11, wherein
the state detection section is further configured to transmit the used amount of the managed article to an external accounting server to cause the accounting server to perform accounting in accordance with the used amount of the managed article.

13. The electronic instrument according to claim 10, wherein
the processing section is further configured to determine whether the state detection section has detected an error that is the same as an error included in the state information acquired from the second electronic instrument, as the processing performed by the processing section when the identification information acquired by the acquisition section is already stored in the second electronic instrument.

14. The electronic instrument according to claim 9, wherein
the managed article is one of ink and a printing medium,
the item accompanying the managed article is an ink cartridge that accommodates the ink, or a spool on which the recording medium is wound, and
the electronic instrument is a printer including a printing section configured to perform printing using the one of the ink and the printing medium.

15. The electronic instrument according to claim 9, wherein
the managed article is one of an ink cartridge and a printing medium,
the item accompanying the managed article is a packaging material that packages the one of the ink cartridge and the printing medium at the time of sale, or an included item which is packaged together with the one of the ink cartridge and the printing medium at the time of sale, and
the electronic instrument is a printer including a printing section configured to perform printing using the one of the ink cartridge and the printing medium.

16. A management method for managing a managed article between first and second electronic instruments configured to communicate with each other, comprising:
acquiring identification information from the managed article installed in the first electronic instrument, the identification information being read-only information uniquely assigned to the managed article, the managed article being installed in the second electronic instrument before being installed in the first electronic instrument;
storing the identification information in a storage section of the first electronic instrument;
detecting an error relating to the managed article used by the electronic instrument;
associating and storing the identification information acquired by an acquisition section and state information which indicates the error relating to the managed article detected by a state detection section;
inquiring from the first electronic instrument to the second electronic instrument as to whether the identification information acquired from the managed article installed in the first electronic instrument is already stored in the second electronic instrument;
performing processing in accordance with a result of inquiry by the first electronic instrument; and
verifying whether the error is reproduced in the electronic instrument when the state information includes error information indicating that the error occurred in the second electronic instrument.

17. The management method according to claim 16, wherein
the identification information is optically-readable invisible information.

18. The management method according to claim 16, wherein
all identification information which has been read by a read control section is accumulated in a state information database.

19. A management method for managing a managed article between first and second electronic instruments configured to communicate with each other, comprising:
acquiring identification information from an item accompanying the managed article installed in the first electronic instrument, the identification information being read-only information uniquely assigned to the managed article, the managed article being installed in the second electronic instrument before being installed in the first electronic instrument;
storing the identification information in a storage section of the first electronic instrument;
detecting an error relating to the managed article used by the electronic instrument;
associating and storing the identification information acquired by an acquisition section and state information which indicates the error relating to the managed article detected by a state detection section;
inquiring from the first electronic instrument to the second electronic instrument as to whether the identification information acquired from the managed article installed in the first electronic instrument is already stored in the second electronic instrument;
performing processing in accordance with a result of inquiry by the first electronic instrument; and
verifying whether the error is reproduced in the electronic instrument when the state information includes error information indicating that the error occurred in the second electronic instrument.

* * * * *